United States Patent Office 3,383,531
Patented May 14, 1968

3,383,531
ELECTRIC ONE-WAY UNHARMONICAL
VIBRATOR
Traian Neculai Gafencu, Bucharest, Rumania, assignor to Ministerul Transporturilor Auto, Navale si Aeriene, Bucharest, Rumania, a firm
Continuation-in-part of application Ser. No. 373,467, June 8, 1964. This application July 18, 1967, Ser. No. 658,585
7 Claims. (Cl. 310—81)

ABSTRACT OF THE DISCLOSURE

Mechanical vibrators of the type which during operation will provide mechanical vibrations for generating at least a nonharmonic, unidirectional force. The vibrator includes a first pair of identical motors having parallel axes and provided with identical dynamically unbalanced rotors which rotate simultaneously at the same speeds in opposite directions, and these motors have no connection of any kind, so that there is, for example, no mechanical transmission of any type between the motors, so that they operate entirely independently of each other. The vibrator includes a second pair of motors which overlie the first pair of motors and which are also identical with each other and have dynamically unbalanced rotors which rotate simultaneously in opposed directions at the same speeds, the second pair of motors also operating entirely independently of each other so that there is no mechanical transmission of any type between these motors. The parallel axes of the second pair of motors are located in a common plane which is parallel to that in which the parallel axes of the first pair of motors are located, and the parallel axes of the second pair of motors have a nonparallel position with respect to the parallel axes of the first pair of motors, so that the parallel pairs of motor axes extend angularly with respect to each other, preferably at a right angle. The motors respectively carry eccentric weights which respectively have centers gravity which respectively rotate in planes normal to the motor axes, and these weights provide the vibratory forces generated by the vibrator.

CROSS REFERENCE TO RELATED APPLICATION

This application is a continuation-in-part of copending application Ser. No. 373,467, filed June 8, 1964, and entitled, Electric One-Way Unharmonical Vibrator.

BACKGROUND OF THE INVENTION

The invention related to vibrators.

In particular, the invention relates to mechanical vibrators capable of producing forces which are periodically repeated so as to achieve a nonharmonic, unidirectional force.

In particular, the invention relates to mechanical vibrators capable of providing not only a periodically repeating force in a given direction but also capable of simultaneously providing a periodically repeating rotary couple having a predetermined axis, and the magnitude of the forces vary according to a predetermined nonsinusoidal law.

The vibrators of the invention may be used for various applications, such as in the construction industry for driving and extracting piles, as well as in the oil industry for lining and drilling wells. Thus, the apparatus of the invention may be used in connection with driving piles filled with sand, lime, reinforced concrete, or having any other construction. Also, the structure of the invention may be used for compacting purposes, such as for compacting earth structures and in connection with concrete construction. Also, the invention may be used in connection with moving or crushing of granular materials, mixing materials such as concrete or other heterogeneous mediums, and also the structure may be used in connection with digging as well as in connection with burying of pipe lines and cables. Certain metallurgical operations, such as deep-drawing of sheets, forging of alloys, compacting of foundry sand in suitable molds, improving the structure of alloys during casting, and the like may be carried on with the structure of the invention.

In addition, the structure may be used in connection with research, such as in the dynamic testing of structural elements and in the taking of undisturbed cores from the earth in connection with geotechnical drilling.

Thus, the apparatus of the invention is of wide general utility wherever vibrators lend themselves for use to achieve periodic, unidirectional forces.

It is conventional to provide vibrators with asynchronous electric motors the rotors of which are unbalanced by eccentric weights fixed upon the motor shafts, and the motors and their eccentric weights can be identical. Inasmuch as the motors and weights are identical, they are generally arranged with their axes parallel to each other while the motors rotate in opposite directions simultaneously. The motors may be situated in a common housing or they may have housings which are fastened together, and it is conventional to interconnect the rotors through a suitable mechanical transmission so that they will be compelled to rotate with respect to each other in opposite directions at the same speeds, for example.

While structures of this latter general type are well known, they have the drawback of producing harmonic, periodic forces which have equal amplitudes in opposed directions extending along a given line, for example, so that the efficiency with which the vibrator operates is reduced because of the sinusoidal variation of the harmonic vibrations, and thus only a reduced efficiency can be achieved for compacting or penetrating of heterogeneous mediums having granular structure made up of grains of different sizes, for example.

Although it is also known to provide vibrators capable of producing nonharmonic, unidirectional forces, periodically repeated, resulting from a fundamental harmonic and superior harmonic vibrations of twice the frequency of the fundamental harmonic vibrations, these known vibrators of this latter type generally consist of two pairs of shafts having eccentric weights with the shafts geared together by gear wheels and driven from a common motor. Vibrators of this general type have the drawback of requiring the gear transmission which is strained alternately in opposed directions resulting in a reduction in their operating life and also resulting in low mechanical efficiency. Also, the operations are accompanied by undesirable noise, and unavoidable parasitic vibrations are generated.

It is also known to provide pendular unidirectional vibrators having a motor with an unbalanced motor which swings around an axis parallel to the axes of rotation of the motor. Vibrators of this type, however, suffer from the drawback of being incapable of producing a force which is uniformly harmonic or uniformly unidirectional, and in addition the moving parts of such structures are quite dangerous.

It is also known to provide electromagnetic unidirectional vibrators wherein an armature of an electromagnet is vibrated back and forth along a straight line. Constructions of this type suffer from the drawback of having the capability of producing only forces of reduced magnitude and being incapable of use except when there is a suitable frequency available in the electrical current.

Combinations of these various known types of vibrators have also been used. However, all of these known structures suffer from the above drawbacks, whether they are used separately or in combination.

SUMMARY OF THE INVENTION

It is accordingly a primary object of the invention to provide a vibrator wherein for each harmonic component of the nonharmonic force achieved with the structure of the invention there are a pair of rotating motors having dynamically unbalanced rotors.

In particular it is an object of the present invention to provide a construction which is quite simple and rugged and which will operate reliably over a long period of time to achieve the desired vibratory forces.

In particular, it is an object of the invention to provide a construction of this type capable of generating a nonharmonic unidirectional force.

Also, it is an object of the present invention to provide construction capable of achieving simultaneously with a nonharmonic unidirectional force a rotary couple, according to the arrangement of the eccentric weights.

Also, it is an object of the invention to provide a construction capable of using any type of motor, such as alternating current, asynchronous three-phase squirrel cage motors, or other types of electric motors, or even hydraulic or pneumatic motors.

The rotors of the motors of the vibrator of the invention are dynamically unbalanced either by unbalanced weights which are fixed on the shafts of the motors at opposite ends of the rotors thereof or by eccentrically unbalancing the rotors in any suitable way.

The vibrator of the invention includes pairs of motors with each pair being identical and operating at the same speed while rotating in opposite directions, the common number of revolutions of the rotors of each pair of motors being equal to the frequency of the periodic force or to the force of the couple which is achieved thereby.

The parallel axes of one pair of motors are situated in a common plane which is parallel to a second plane which includes the parallel axes of the second pair of motors, and the parallel axes of the one pair of motors have a nonparallel, preferably perpendiculr relation with respect to the parallel axes of the second pair of motors. The pairs of motors can be situated in a common housing, or they may be situated in separate housing which are rigidly connected.

According to an important feature of the present invention the pairs of motors have absolutely no mechanical connection so that they operate entirely independently of each other without any mechanical transmission therebetween. Thus, all of the motors of the vibrator of the invention have no interconnection which would provide any predetermined interdependence of the operation of the motors, the only interdependence of their operation resulting from the laws of physics due to the simultaneous rotation of the motors, their common support and with each pair of motors rotating simultaneously at the same speed in opposite directions. The phenomenon of producing the periodic, unidirectional nonharmonic force, with or without the simultaneous couple, at the vibrators of the invention is achieved because of each motor with its dynamically unbalanced rotor produces, a centrifugal force of constant magnitude, the directions of which rotate at a constant speed around the axes of the motor in a plane in which the center of gravity of the eccentric weight turns, this eccentric weight providing the unbalancing of the rotor.

Each pair of motors with their unbalanced rotors produces usually a harmonic resulting force and a couple of resulting harmonic forces having a predetermined, unchanging distance from each other and with respect to a predetermined axes of symmetry which is perpendicular to the plane which includes the parallel axes of rotations of one or the other of the pairs of motors. In accordance with resonance effects, determined by the laws of physics, the pairs of motors will automatically have equal numbers of revolutions and the centrifugal forces provided by the eccentric rotary weights driven by the motors will automatically have equal phases of operation. As a result, the perpendicular components in the plane of the rotation axes of the centrifugal forces achieve the same magnitudes and directions and add together, thus determining the harmonic unidirectional force, and the components in the plane of the axes of rotation of the centrifugal forces become equal in size while having opposite directions so as to determine the harmonic uniaxial couple which is in phase opposition to the harmonic unidirectional force, producing in this way an automatic self-equilibrium in the operation.

In the special case where the planes of rotation of the centers of gravity of the eccentric weights which unbalance the rotor coincide with each other, the couple is reduced to zero and only the harmonic, unidirectional force remains.

The assembly of the pairs of motors with their unbalanced rotors results generally in a nonharmonic resultant force as well as in a couple of resultant nonharmonic forces having predetermined locations with respect to a given unchanging axis which is in fact the common axis of symmetry extending perpendicularly to the axes of rotation of all of the motors, the force having a magnitude determined by the algebraic sum of all of the forces and the couples produced by each pair of forces.

BRIEF DESCRIPTION OF DRAWINGS

The invention is illustrated by way of example in the accompanied drawings which form part of this application and which.

DESCRIPTION OF PREFERRED EMBODIMENTS

The embodiments of vibrators shown in FIGS. 1–4, in accordance with the invention, are constructed so as to produce unidirectional nonharmonic forces Q as well as a couple of nonharmonic uniaxial force-couples C, or only forces resulting from the superposition of fundamental, harmonic unidirectional forces $F_V$ on sperior harmonic, unidirectional forces $f$, the frequency of the latter forces having with respect to each other the ratio $p=2$.

The vibrators in the illustrated examples include a pair of asynchronous squirrel cage electric motors 1 (FIG. 3) which have their shafts 2 respectively equipped with eccentric weights 5, the moment of mass being ME, and the number of revolutions per minute $n$, so that the motors respectively have angular velocities $$p\omega = \frac{\pi n}{15}$$

Figure 2:
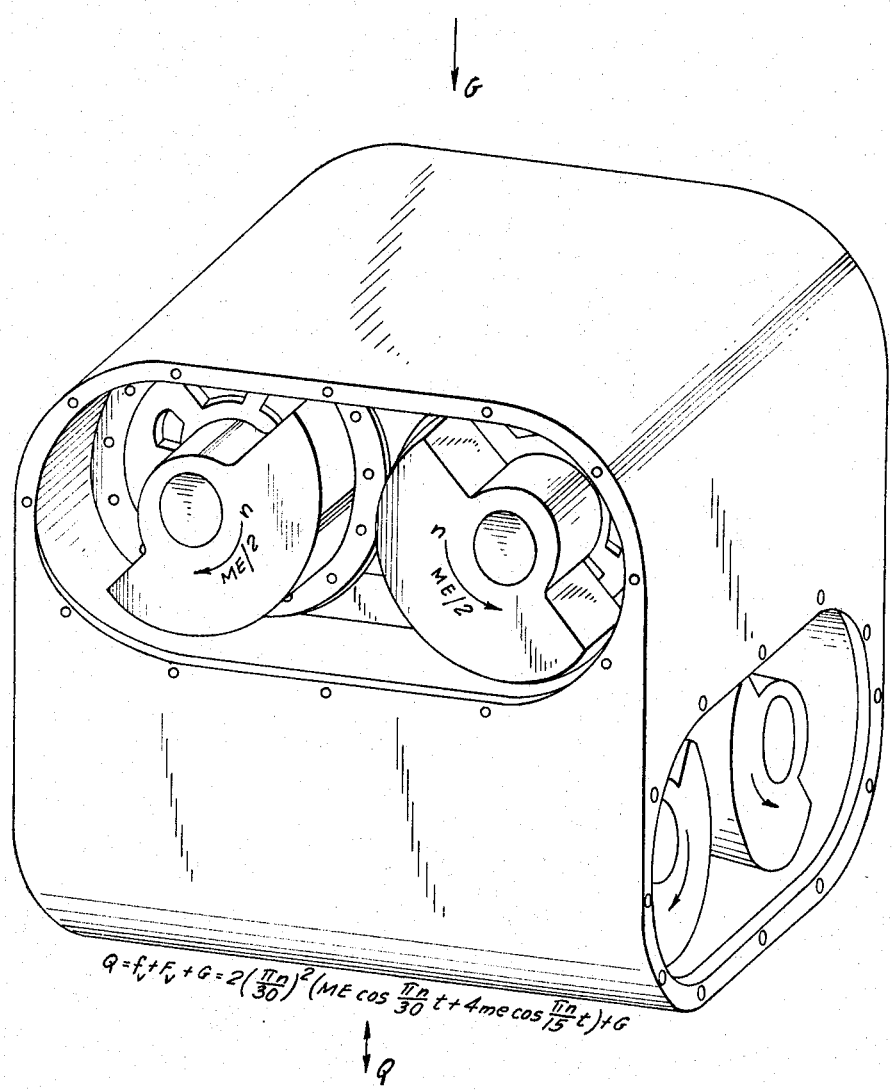
FIG. 2 is a perspective partly schematic illustration of one possible embodiment of a vibrator according to the invention, showing the forces and formulas for calculating the forces.

The oscillatory of vibratory system, to which the vibrator of the invention belongs, is acted upon by an external force G (FIG. 2), considered in the direction of the axis of the unidirectional force or the force-couple produced by the vibrator, this external force being indicated by the arrow G in FIG. 2. The curved arrows of FIG. 2 indicate the directions of rotation of the motor shafts.

Figure 4:
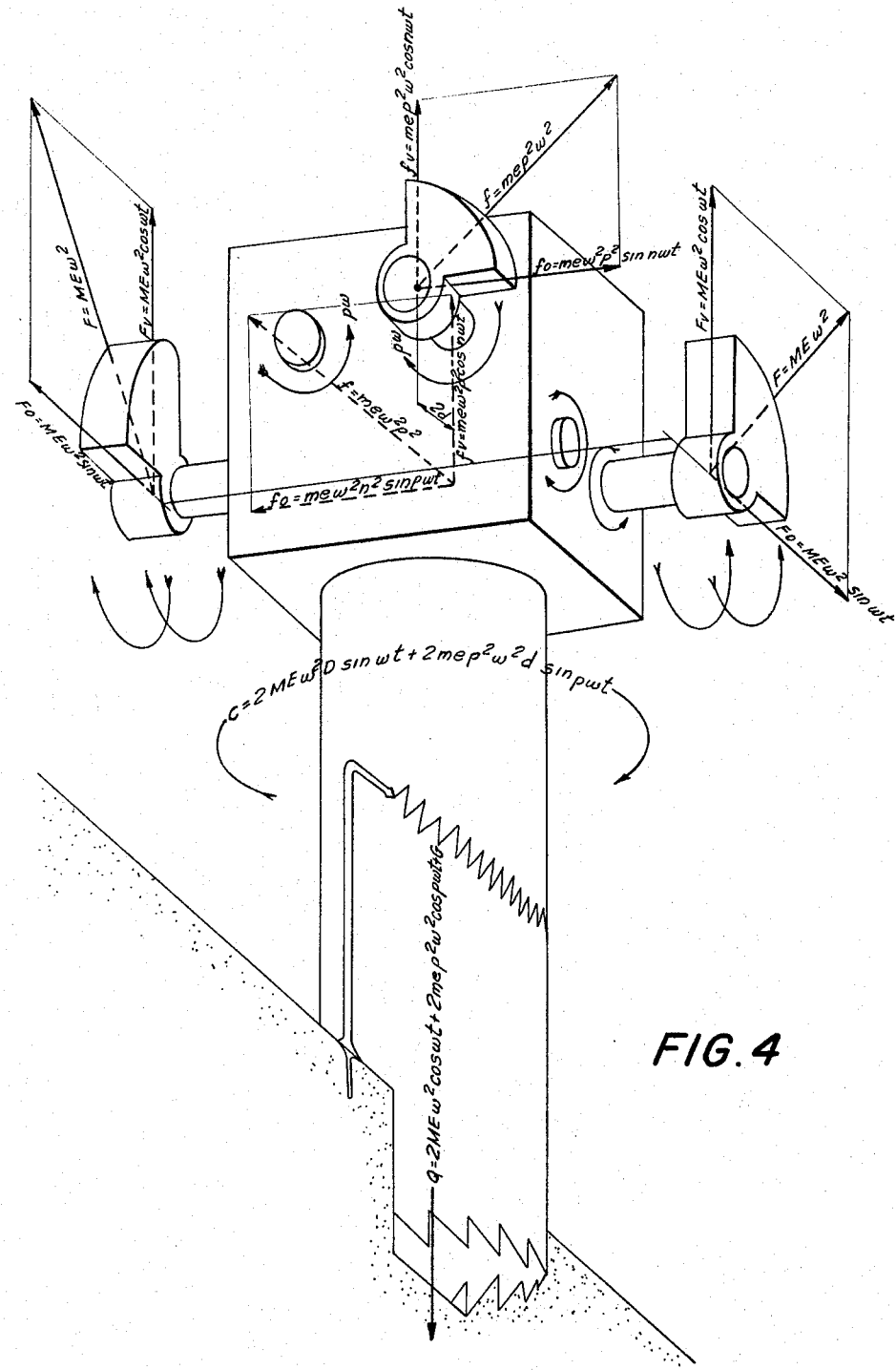
FIG. 4 is a schematic representation of the manner in which the structure of the invention may be used in a practical way while achieving both a unidirectional force which is periodically repeated and a rotary couple which is periodically repeated.

The straight arrows of FIG. 4 indicate the direction of the fundamental centrifugal force $F = ME\ \omega^2$ and the superior harmonic force $f = mep^2\omega^2$. The perpendicular component forces in the plane of the axes of rotation, the fundamental forces $F_V = Me\omega^2 \cos \omega t$ and the superior harmonic force $f_v = mep^2\omega^2 \cos p\omega t$. The component forces in the planes of the rotary axes, the fundamental $$F_o = ME\omega^2 \sin \omega t$$

also, the resultant force $$Q = F_v + f_v + G = 2ME\omega^2 \cos \omega t + 2mep\omega^2 \cos p\omega t + G = 2\left(\frac{\pi n}{30}\right)^2 \left(Me \cos \frac{\pi n}{30}t + 4me \cos \frac{\pi n}{15}t\right) + G$$

As is indicated in FIG. 4, the interrupted curved arrow indicates the nonharmonic, uniaxial resulting couple $C = 2ME\omega 2D \sin \omega t + 2mep^2\omega^2 d \sin p\omega t$ produced by the vibrator simultaneously with the force Q.

The rotary planes of the centers of gravity of the eccentric weights on the motor shafts produce the harmonic fundamental force and these planes establish the distance 2D, and the rotation planes of the eccentric weights on the shafts produce the superior harmonic periodic forces which are spaced at the distance 2d.

Figure 1:
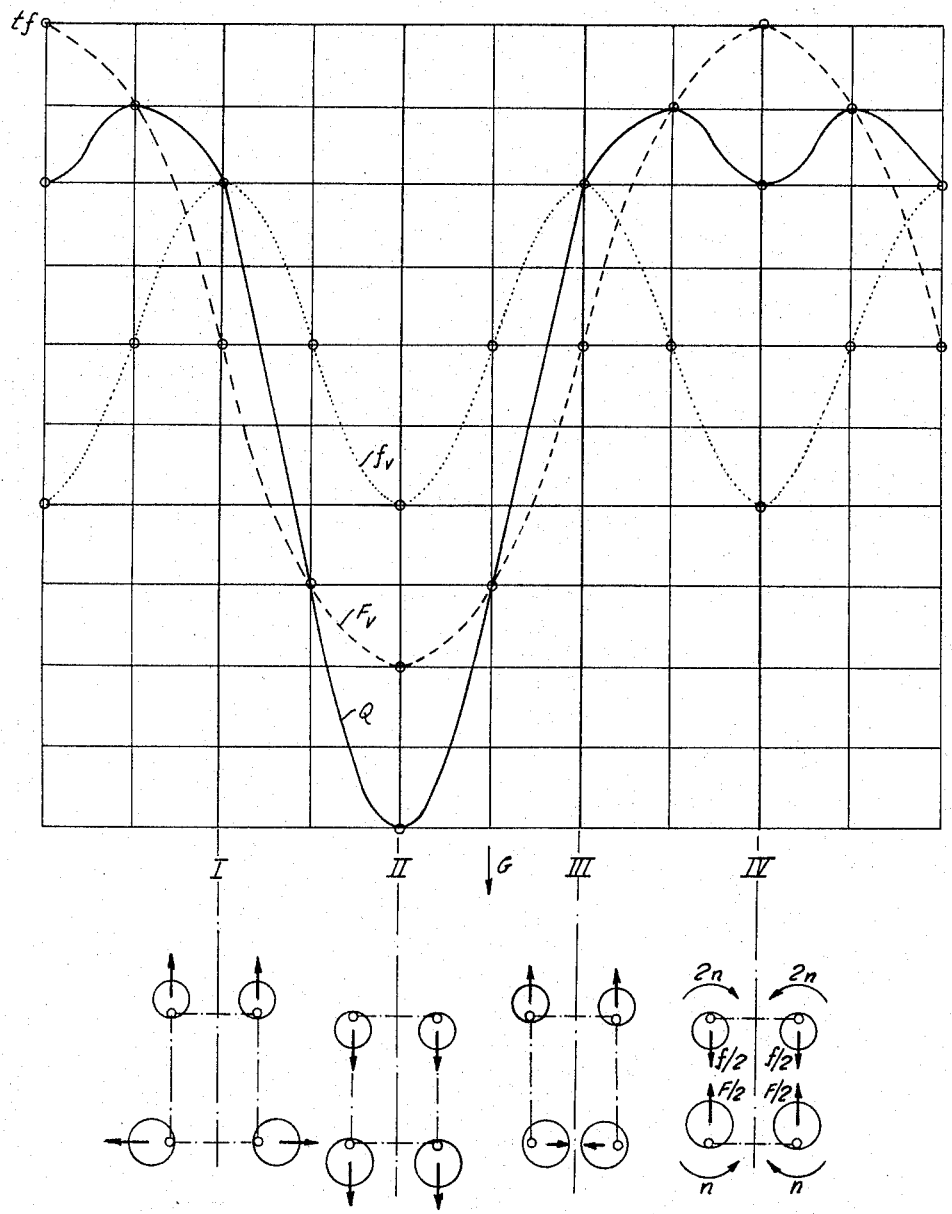
FIG. 1 is a diagrammatic representation of the forces achieved with the structure of the invention and of the manner in which the unbalanced weights rotate.

FIG. 1 shows diagrammatically the variation of the sizes of the periodic forces, namely the fundamental, harmonic force F, the superior harmonic f, and the resulting nonharmonic force Q. Thus, referring to the upper part of FIG. 1, there is graphically illustrated the fundamental force F, the superior harmonic oscillatory force f, and the force Q resulting from the addition thereof. The force G is also indicated.

Beneath the curves of FIG. 1 the positions of the unbalanced weights of the pairs of motors are diagrammatically illustrated. Thus, at the left lower portion of FIG. 1 it is diagrammatically indicated that the centers of gravity of the lower pairs of eccentric weights are nearest to each other while the centers of gravity of the upper pairs of eccentric weights are at the lowest points of their rotary travel, thus producing the combination of outwardly and upwardly directed forces which give the points on the curves aligned with the centerline passing through the left positions of the eccentric weights schematically indicated in FIG. 1. In the same way, the next diagram at the lower portion of FIG. 1 indicates the lower eccentric weights having their centers of gravity at the uppermost part of their travel with the upper eccentric weights also having their centers of gravity at the uppermost parts of their travel, so that in reaching the second position of FIG. 1 from the first position shown at the left on FIG. 1 the upper rotors have turned through 180° in opposed directions while the lower rotors have turned only through 90° in opposed directions, and it will be noted that all of the rotors at this instant produce downwardly directed forces resulting in the points on the curves aligned with the bottom crest thereof as shown at the centerline passing through the second diagram at the lower portion of FIG. 1.

The third diagram at the lower portion of FIG. 1 shows how the forces of the upper eccentrics are again directed upwardly when the rotors have again turned in opposed directions through 180°, while the lower rotors have continued to rotate only through 90° in opposed directions thus situating the centers of gravity of the lower eccentric weights at their positions most distant from each other and producing the inwardly directed forces resulting in the points of the curves which are aligned with the centerline of the third diagram from the left at the lower portion of FIG. 1. Finally, the last diagram at the right on FIG. 1 indicates that the upper rotors rotate in opposed directions at twice the speed of the lower rotors with each of the lower rotors providing one half of the fundamental forces and each of the upper rotors provides one half of the superior harmonic, and in the position of the rotors indicated in the last diagram of FIG. 1 the centers of gravity in the upper weights are situated again at the uppermost parts of their paths of travel having turned through 180° from their previous position while the lower centers of gravity have again turned in the directions indicated at the lower right of FIG. 1 through 90° to reach the lowermost parts of their travel providing the upwardly directed forces indicated in the right diagram of FIG. 1 at the lower part thereof.

Thus, it will be seen that when the eccentric weights have the position shown at the lower right of FIG. 1, the superior harmonic forces, which have twice the frequency of the fundamental forces, oppose the latter, whereas in the second diagram at the lower part of FIG. 1 of the forces added together and in the first and third diagram of FIG. 1 the forces of higher frequency are both directed upwardly while in the first phase on the left of FIG. 1 the fundamental forces of the pair of motors are directed away from each other and in the third phase they are directed towards each other.

In the embodiment of the invention which is diagrammatically illustrated in FIG. 2, all of the motors and the eccentric weights are carried by a common housing or block wherein the rotors of the motors have the unbalanced eccentric weights fixed thereto as illustrated so that for each pair of motors which have parallel axes the centers of gravity of the eccentric weights rotate in a common plane. It will be noted that in this construction it is the lower pair of motors which rotate at twice the speed of the upper pair of motors producing the superior harmonic frequency which is twice that of the fundamental frequency achieved by the upper pair of motors of this embodiment.

Figure 3:
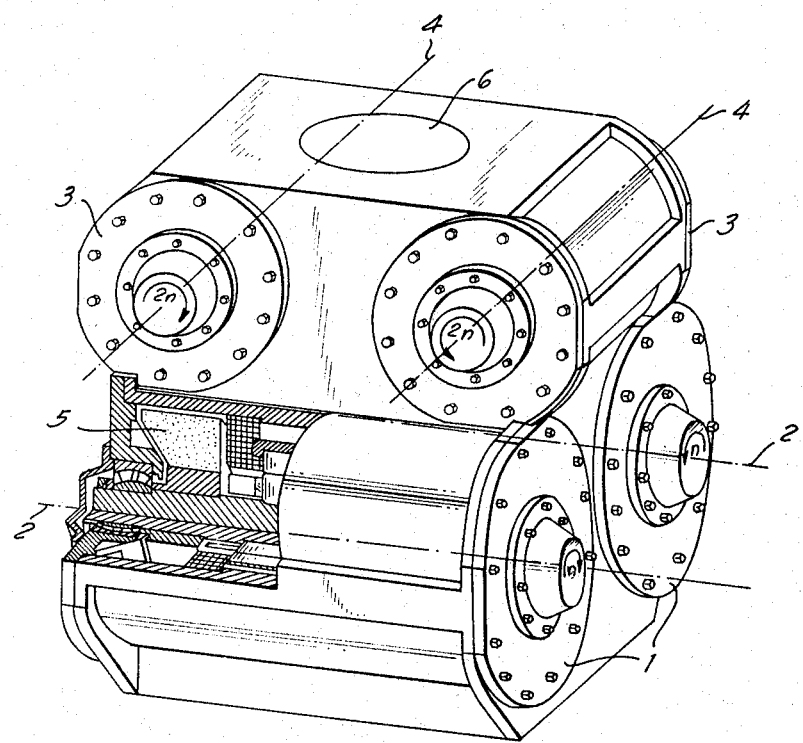
FIG. 3 is a partly sectional and partly schematic illustration of another embodiment of a vibrator according to the invention.

On the other hand, in the embodiment indicated in FIG. 3, there are also two pairs of motors with the axes of one pair extending perpendicular to the axes of the other pair, but in this case it is the upper pair of motors which rotate at twice the speed of the lower pair of motors. In this case also the eccentric weights 5 are situated in common planes for each pair of motors. The common housing structure shown in FIG. 3 carries bearings for the motor shafts as illustrated. It will be noted that the housing of the embodiment of FIG. 3 is provided with an opening 6 which passes vertically through the entire housing so that it is possible in this way to receive in the opening a pipe or the like which is fixed to the housing in the opening 6 thereof, so that in this way the vibrator may be mounted on the work which is to be vibrated.

This arrangement is described further below in connection with FIG. 4. It has been found that the best results are achieved where the opening 6, whose axis extends between the parallel axes of both pairs of motors, has a diameter which is greater than one fourth the distance between the parallel axes of the pairs of motors.

FIG. 4 diagramatically illustrates a vibrator of the of the invention during operation where this vibrator achieves, simultaneously with the unidirectional periodic force, a rotary couple so that the work is not only driven vertically but also is rotated. Thus, FIG. 4 illustrates how a pipe may be driven into the ground, this pipe being received in an opening, such as the opening 6 of the housing which carries the rotary motors, and the pipe is fixed to the housing in the opening 6 thereof in any suitable way as by being threaded into the latter.

In the example which is shown in FIG. 4, the pair of eccentric weights carried by the shafts of the lower motors are situated in axially displaced planes so that their centers of gravity respectively rotate in axially displaced planes which are normal to the parallel axes of the lower rotors. These lower rotors rotate in the illustrated directions, and in this case it is the lower motors which rotate at the lower speed in opposed directions and which produce the fundamental force. FIG. 4 illustrates the distance 2D between the plane in which the center of gravity of the lower left eccentric weight of FIG. 4 rotates and the plane in which the center of gravity of the lower right eccentric weight of FIG. 4 rotates. In addition, FIG. 4 illustrates the manner in which the above-described forces are achieved by the rotary vibratory structure.

The upper pair of oppositely rotating motors provide in the embodiment of FIG. 4 the superior harmonic frequency which is twice that of the lower pair of motors, as pointed out above, and FIG. 4 also indicates that the distance is 2d between the plane in which the center of gravity of the front upper eccentric weight rotates and the plane in which the center of gravity of the rear upper unillustrated weight rotates. Thus, the various forces, their components and resultants, and the formulas by which they are calculated are all indicated in FIG. 4 which in addition shows the rotary couple C and the formula for driving the vibrator as well as the direction of rotation thereof. This rotary couple is achieved in a case such as that of FIG. 4 where for each pair of motors the eccentric weights carried thereby are respectively located in different planes.

Thus, in the case of FIG. 4, in order to illustrate the combined effect of the unidirectional force and the force couple, the vibrator of the invention is shown attached to a drilling string which is equipped with a gear rim for core drilling. Also, FIG. 4 indicates a mark which would be made on the exterior of the driven pipe by a pen fixed with respect to the soil, this mark being provided on the string at a place where the latter is exposed to the pen which will thus illustrate the action of the vibrator and the force of gravity.

When the oscillatory vibratory system of the invention is acted upon by an exterior force of invariable magnitude and direction, this latter exterior force acting with an appreciable significant component in the direction of the unidirectional vibratory force and the couple produced by the vibrator, which if the case of FIG. 4 is the force of gravity or the lifting force of the crane operating on the vibrator, there is also an effect of resonance, determined by physical laws, so that as a result of this effect of resonance the pairs of motors equalize their relative slip and the forces and couples produced by the motors establish their phases so that the motors automatically arrive at their maximum force values in the direction in which the action of the outside force operates. In this way although there is no mechanical connection or transmission of any type between the motors, nevertheless they will operate automatically in phase to achieve the above resonance and above results. This resonance is in fact facilitated as a result of the elimination of any mechanical transmission of any type between the motors, so that according to this feature of the invention not only will there be an automatic synchronizing of the operation resulting from the resonance effect but in addition the elimination of the mechanical transmission will result in the elimination of undesirable friction and inertia forces.

In accordance with the invention it is desirable and possible to achieve certain structural advantages without technical difficulties, in that the equidistant planes between the pairs of motors have the axes of the pairs of motors extending angularly with respect to each other at a predetermined angle, which is preferably a right angle, so as to avoid any parasitic influences which would oppose the production of the above-mentioned resonance phenomena.

In accordance with the invention it is also advisable and possible, without substantially increasing the size and weight of the vibrator, to equip the housing with the axial cavity of relatively large diameter so that in this way the material equipment necessary for the operations can be situated in this cavity, such as the cavity 6 of FIG. 3.

The possibility of this construction is derived from the fact that usually the rotors of the motors are situated at a given distance from each other to assure that there will be the required rotary space for the eccentric weights which are fixed at each side of the rotors of the motors.

The vibrator structure of the invention has the following advantages:

The construction is simple and does not require any advanced technical knowledge for execution and operation, inasmuch as the entire construction is made up primarily only of motors with unbalanced rotors.

The structure can provide a high frequency as there are no limitations provided by mechanical transmission which must operate at high speed.

The structure is very durable inasmuch as there is a minimum number of elements subjected to wear, other than roller bearings of current construction.

It is possible to alter the operations without stopping the vibrator by independently starting and stopping each pair of motors, and through any suitable conductors it is possible to deliver the electrical energy to the motors as well as to locate the motors in suitable circuits for controlling the latter.

The vibrator is completely noiseless inasmuch as there are no elements which will provide noisy friction or impact which will result in undesirable noise.

It is possible to easily achieve an axial cavity, such as the cavity 6, of large size, inasmuch as this feature does not require any substantial increase in the size and weight of the structure and is in no way limited by the speed of any transmission elements.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. In a vibrator for providing mechanical vibrations which generate at least a nonharmonic, unidirectional force, a first pair of identical motors situated one beside the other and having parallel axes located in a common plane, said motors having unbalanced rotors which rotate at the same speed in opposite directions and said motors being completely independent of each other so as to operate independently without any transmission of any kind therebetween, and a second pair of identical motors also having unbalanced rotors which rotate at the same speeds in opposite directions, said second pair of motors overlying said first pair of motors and being completely unconnected therefrom as well as completely independent of each other so as to operate without any transmission of any kind therebetween, said second pair of motors also having parallel axes located in a common plane parallel to that in which the axes of said first pair of motors are located, and a plurality of eccentric weights contributing to the unbalancing of the rotors respectively having centers of gravity and respectively being operatively connected to said motors for rotation therewith with said centers of gravity of said weights respectively turning in planes which are respectively normal to the axes of said motors.

2. The combination of claim 1 and wherein the parallel axes of said second pair of motors extend angularly with respect to the parallel axes of said first pair of motors at an angle which situates said parallel axes of said second pair of motors in a nonparallel position with respect to said parallel axes of said second pair of motors.

3. The combination of claim 2 and wherein the axes of said second pair of motors extend perpendicularly with respect to the axes of said first pair of motors.

4. The combination of claim 1 and wherein the eccentric weights respectfully fixed to each pair of motors are displaced from each other so that their centers of gravity rotate in different planes to provide a rotary couple in addition to said unidirectional force.

5. The combination of claim 1 and wherein the eccentric weights respectively fixed to each pair of motors have their centers of gravities rotating in a common plane normal to the parallel axes of each pair of motors.

6. The combination of claim 1 and wherein a housing carries said pairs of motors and is formed with an opening passing through said housing along an axis perpendicular to all of the motor axes with said axis of said opening extending between the parallel axes of both pairs of motors, and said opening having a diameter greater than one fourth the distance between the parallel axes of each pair of motors.

7. The combination of claim 1 and wherein the motors of one of said pairs of motors rotate at twice the speed of the motors of the other pair of motors to provide a superior harmonic force having a frequency which is twice that of a fundamental force produced by said other pair of motors.

References Cited
UNITED STATES PATENTS

| | | | |
|---|---|---|---|
| 3,210,529 | 10/1965 | Sonoda | 310—81 |
| 3,091,712 | 5/1963 | Galbraith | 310—81 |
| 2,235,183 | 3/1941 | Wettlaufer | 310—81 |

MILTON O. HIRSHFIELD, *Primary Examiner.*

J. D. MILLER, *Examiner.*